United States Patent [19]
Eckart et al.

[11] Patent Number: 5,958,539
[45] Date of Patent: Sep. 28, 1999

[54] THERMOPLASTIC ARTICLE HAVING TEXTILE FIBER FABRIC EMBEDDED THEREIN

[75] Inventors: Michael Dennis Eckart, Blountville, Tenn.; Raymond Lynn Goodson, Sandy, Utah

[73] Assignee: Eastman Chemical Company, Kingsport, Tenn.

[21] Appl. No.: 09/096,969

[22] Filed: Jun. 12, 1998

Related U.S. Application Data

[60] Provisional application No. 60/056,959, Aug. 26, 1997.

[51] Int. Cl.$^6$ .............................. B32B 27/08; C09D 5/29
[52] U.S. Cl. .............................. 428/46; 428/47; 428/111; 428/212; 428/213; 428/332
[58] Field of Search .................... 428/212, 213, 428/332, 46, 47, 111; 528/271, 272, 302, 307

[56] References Cited

U.S. PATENT DOCUMENTS 5,643,666   7/1997   Eckart et al. .

FOREIGN PATENT DOCUMENTS 0 271 288 A2   6/1988   European Pat. Off. .
44 15 432 A1   11/1996   Germany .

OTHER PUBLICATIONS

U.S. Application Ser. No. 09/096,970 Filed Jun. 12, 1998, Entitled "Thermoplastic Article Having Metallic Wire, Rod or Bar Embedded Therein" by Michael Dennis Eckart and Raymond Lynn Goodson.

U.S. Application Ser. No. 09/100,219 Filed Jun. 19, 1998, Entitled "Thermoplastic Article Having High–Relief Surface" by Michael Dennis Eckart and Rayamond Lynn Goodson.

*Primary Examiner*—Richard Weisberger
*Attorney, Agent, or Firm*—Cheryl J. Tubach; Harry J. Gwinnell

[57] ABSTRACT

Disclosed is a novel thermoplastic article having a fabric comprised of textile fibers embedded therein produced by applying heat and pressure to a laminate comprising, in order, (1) an upper sheet material, (2) a fabric comprised of textile fibers, and (3) a lower sheet material to produce a thermoplastic article having the fabric embedded therein. The upper and lower sheet materials are formed from a copolyester having an inherent viscosity of 0.5 to 1.2 dL/g, when measured at 25° C. using 0.50 grams of polymer per 100 mL of a solvent consisting of 60 weight percent phenol and 40 weight percent tetrachloroethane, comprising (i) diacid residues comprising at least 80 mole percent terephthalic acid residues; and (ii) diol residues comprising from 98 to 1 mole percent ethylene glycol residues and from 2 to 99 mole percent residues derived from 1,3- or, preferably, 1,4-cyclohexanedimethanol in which the ethylene glycol and cyclohexanedimethanol residues constitute at least 80 mole percent of the diol residues.

7 Claims, No Drawings

THERMOPLASTIC ARTICLE HAVING TEXTILE FIBER FABRIC EMBEDDED THEREIN

REFERENCE TO RELATED APPLICATION

This application claims the benefit of U.S. Provisional Application Ser. No. 60/056,959, filed Aug. 26, 1997.

FIELD OF THE INVENTION

This invention pertains to a novel thermoplastic article having a fabric comprising textile fibers embedded therein. More specifically, this invention pertains to an article produced by applying heat and pressure to a laminate comprising, in order, an upper sheet material, a fabric composed or made of textile fibers, and a lower sheet material to produce a thermoplastic article having the fabric embedded therein. The novel thermoplastic articles provided by the present invention may be used in the construction industry as glazing for windows, in partitions and as decorative panels. One or both surfaces of the articles may be textured during the formation of the articles.

BACKGROUND OF THE INVENTION

Glass, both transparent and translucent, has been used as glazing material for windows and partitions and, for certain uses, it is painted or stained to provide specific decorative effects. Glass is high in density and weight, is difficult to fabricate at the work site, is generally brittle, and can constitute a safety hazard.

Glass substitutes such as polyvinyl chloride sheeting, acrylic, e.g., poly(methyl methacrylate), sheeting and polycarbonate sheeting have been used as substitutes for glass in certain glazing applications. Generally, these substitutes are made for clear (transparent), non-decorative applications. The sheet material provided by this invention may be used primarily for producing or obtaining decorative applications with varying degrees of transparency and various levels of enhanced security.

SUMMARY OF THE INVENTION

The present invention provides a thermoplastic article, typically in the form of sheet material, having a fabric comprising textile fibers embedded therein. The thermoplastic article is obtained by applying heat and pressure to a laminate or "sandwich" comprising, in order, (1) an upper sheet material, (2) a fabric comprised of textile fibers, and (3) a lower sheet material. The upper and lower sheet materials are produced from certain copolyesters containing repeating units of terephthalic acid residues, ethylene glycol residues and cyclohexanedimethanol residues. Thus, the present invention comprises a thermoplastic article having a fabric comprised of textile fibers embedded therein obtained by applying heat and pressure to a laminate comprising, in order, (1) an upper sheet material, (2) a fabric comprised of textile fibers, and (3) a lower sheet material;

wherein the upper and lower sheet materials are formed from a copolyester having an inherent viscosity of 0.5 to 1.2 dL/g, when measured at 25° C. using 0.50 grams of polymer per 100 mL of a solvent consisting of 60 weight percent phenol and 40 weight percent tetrachloroethane, comprising:

(i) diacid residues comprising at least 80 mole percent terephthalic acid residues; and
(ii) diol residues comprising from 98 to 1 mole percent ethylene glycol residues and from 2 to 99 mole percent residues derived from 1,3- or, preferably, 1,4-cyclohexanedimethanol in which the ethylene glycol and cyclohexanedimethanol residues constitute at least 80 mole percent of the diol residues.

DETAILED DESCRIPTION OF THE INVENTION

The copolyesters which comprise the thermoplastic article of the present invention are known compositions of matter. One of these copolyesters is commercially available from Eastman Chemical Company as PETG Copolyester. These copolyesters comprise repeating units of diacid residues and diol residues. At least 80 mole percent of the diacid residues are terephthalic acid residues. The diacid component of the copolyesters optionally may comprise up to 20 mole percent of one or more other dicarboxylic acid such that the sum of the dicarboxylic acid units is equal to 100 mol percent. Examples of such other dicarboxylic acids include phthalic acid, isophthalic acid, 1,4-, 1,5-, 2,6- or 2,7-naphthalenedicarboxylic acid, 1,3- or 1,4-cyclohexanedicarboxylic acid (which may be cis, trans or a mixture thereof), cyclohexanediacetic acid, trans-4,4'-stilbenedicarboxylic acid, 4,4'-oxydibenzoic acid, 3,3'- and 4,4'-biphenyldicarboxylic acids and aliphatic dicarboxylic acids such as malonic, succinic, glutaric, adipic, pimelic, suberic, azelaic, sebacic, nonane, decane, and dodecanedicarboxylic acids. The "residue" of the dicarboxylic acids described herein is that portion of the diacid which constitutes a portion of a diester of the diacid. The diacid residues may be derived from the dicarboxylic acid, dialkyl esters thereof, e.g., dimethyl terephthalate and bis(2-hydroxyethyl) terephthalate, acid chlorides thereof and, in some cases, anhydrides thereof.

The diol component of the copolyesters comprises from 98 to 1 mole percent ethylene glycol residues and 2 to 99 mol percent 1,3-cyclohexanedimethanol and/or 1,4-cyclohexanedimethanol. Up to 20 mole percent of the diol component may be made up of the residues of one or more diols other than ethylene glycol and cyclohexanedimethanol such that the sum of all diol residues is 100 mole percent. Examples of such additional diols include cycloaliphatic diols having 3 to 16 carbon atoms and aliphatic diols having 3 to 12 carbon atoms. Specific examples of such other diols include 1,2-propanediol, 1,3-propanediol, neopentyl glycol, 1,4butanediol, 1,5-pentanediol, 1,6-hexanediol, 2,2,4,4-tetramethyl-1,3-cyclobutanediol (trans-, cis- or mixtures thereof), and p-xylylene glycol. The copolyesters also may be modified with minor amounts of polyethylene glycols or polytetramethylene glycols to enhance elastomeric behavior, e.g., polyethylene glycols and polytetramethylene glycols having weight average molecular weights in the range of about 500 to 2000. The diol component of the copolyesters preferably consists essentially of residues of ethylene glycol and 1,4-cyclohexanedimethanol wherein the mole ratio of ethylene glycol residues: 1,4-cyclohexanedimethanol residues is about 10:90 to about 90:10, most preferably about 60:40 to about 80:20.

The copolyesters have an inherent viscosity in the range of 0.5 to 1.2 dL/g when measured at 25° C. using 0.50 grams of polymer per 100 ml of a solvent which consists of 60% by weight phenol and 40% by weight tetrachloroethane. The copolyesters utilized in the thermoplastic article of the present invention preferably have an inherent viscosity of 0.6 to 0.9 dL/g (measured as described herein) and, most preferably, consist of terephthalic acid residues, ethylene glycol residues, and 1,4-cyclohexanedimethanol residues.

The copolyesters useful in the present invention may be prepared by conventional polycondensation procedures well-known in the art. Such processes include direct condensation of the dicarboxylic acid(s) with the diols or by ester interchange using a dialkyl or diaryl dicarboxylate. For example, a dialkyl terephthalate, e.g., dimethyl terephthalate or bis(2-hydroxyethyl) terephthalate, or a diaryl ester such as diphenyl terephthalate is ester interchanged with the diols at elevated temperatures in the presence of a polycondensation catalyst.

The second component of the thermoplastic articles of the present invention comprises a fabric comprised of textile fibers. The fabric may display images or decorative designs which have been produced, e.g., by weaving or knitting techniques, in the fabric. The fabrics which may be used in producing the articles of the present invention comprise textile fibers, i.e., fibers of natural-occurring, semisynthetic or synthetic polymeric materials. For example, the fabrics may be prepared from cotton, wool, silk, rayon (regenerated cellulose), polyester such as poly(ethylene terephthalate), synthetic polyamides such as nylon 66 and nylon 6, acrylic, modacrylic and cellulose acetate fibers. The melting point of the textile fibers should be sufficiently high to avoid any degradation or distortion of the fabric during the manufacture or processing of the articles of this invention. The fabric may be woven, spun-bonded, knitted, or prepared by other processes well known in the textile trade and may be uncolored, e.g., white, or colored by conventional dyeing and printing techniques. Alternatively, the fabrics may be produced from dyed yarn or from filaments and yarn derived from mass colored polymers. Normally, the fabrics present within the thermoplastic articles of the present invention are substantially continuous and constitute a distinct layer or laminae. One embodiment of our invention, therefore, is a novel laminate article comprising, in order, (1) a layer of copolyester, (2) a fabric layer composed or made of textile fibers, and (3) a second layer of copolyester wherein the copolyester is described hereinabove.

The thermoplastic articles of our invention can be used in the manufacture of decorative walls, partitions, and glazing applications. The thermoplastic articles are thermoformable according to methods known in the art of thermoforming.

The upper and lower sheet materials used in the manufacture of the thermoplastic articles of the present invention may be the same or different. For example, the upper and lower sheet materials may be produced from different copolyesters (as defined herein) or copolyester compositions which contain different additives, e.g., pigment additives which alter the transparency of the copolyester sheeting. Alternatively, one of the sheet materials may be produced from a virgin polyester and the other may be produced from a less expensive, recycled copolyester.

The sheet material used in the preparation of the thermoplastic articles of our invention may be transparent, translucent, or one layer may be opaque, depending on the particular aesthetic effect desired. The upper and lower sheet materials may differ in degree of transparency or translucency and also in color. When the upper and lower sheet materials are produced from different copolyesters, the copolyesters must be thermally compatible. As used herein, the term "thermal compatibility" means that when layers of the sheet materials are bonded together under conditions of elevated temperature and pressure, the layers undergo approximately equal thermal expansion or contraction such that the solid surface is substantially planar.

The thickness of the sheet materials used in the preparation of the thermoplastic articles is not an important feature of the present invention and depends upon a number of factors such as functionality, weight, cost and the like. The sheet material from which the upper (or outer) layer or surface is formed generally has a thickness in the range of about 0.76 to 6.4 mm (0.03–0.25 inch), preferably in the range of about 1.6 to 3.2 mm (0.063–0.126 inch). The sheet material from which the lower (or backing) layer or surface is formed typically has a thickness in the range of about 0.76 to 6.4 mm (0.03–0.25 inch), preferably about 3.2 mm (0.126 inch).

The thermoplastic article of the present invention may be produced by subjecting a sandwich comprising (1) an upper sheet material, (2) a fabric comprised of textile fibers and (3) a lower sheet material to temperatures and pressures sufficient to cause the upper and lower sheet materials to bond (or fuse) to each other. However, temperatures which cause decomposition, distortion, or other undesirable effects in the finished article or sheet material should be avoided. Normally, the bonding temperatures are in the range of about 90 to 300° C. (194 to 572° F.), preferably in the range of about 129 to 260° C. (265 to 500° F.). The pressures utilized in the bonding or laminating of the sandwich preferably are in the range of about 0.65 to 3.45 MPa (about 95 to 500 pounds per square inch—psi). The optimal temperature for bonding the thermoplastic articles will vary depending, for example, on the particular copolyester(s) employed and the thickness of the sheet materials used, and may be determined by those skilled in the art. The sandwich or laminate is held at the appropriate temperature and pressure for about 4 to 24 minutes, or until such time as a bond is formed between the upper and lower sheet materials. After 4 to 24 minutes, the bonded/fused thermoplastic article is allowed to cool under pressures from about 0.69 to 2.4 MPa (about 100 to 350 psi), preferably about 1.4 MPa (200 psi), until it cools below the glass transition temperature of the copolyester sheet material(s). During the bonding process, the copolyester sheet materials may be bonded or fused to each other without the use of an adhesive. The lamination process may utilize adhesives or coupling agents on the fabric to enhance the adhesion of the copolyester sheet material to the fabric.

In the bonding process used to prepare the thermoplastic articles of this invention, a thin plastic film or paper that has a melting or softening point higher than that of one or both of the upper and lower sheet materials to be laminated is placed adjacent to and on the outside of the structure to be laminated. This film or paper may be either smooth or possess a pattern(s). Over this film/paper is placed a flexible metal plate having a thickness of 20–140 mils (508 to 3556 microns). A fabric pad about 6.4 mm (0.25 inch) thick is placed over the plate. This fabric pad can be composed of a variety of materials such as a silicone material or a fabric constructed of aramid fibers such as Nomex fibers and can contain copper wire to promote heat transfer. The primary purpose of the pad is to equalize the pressure to the metal plate which it covers. The material then is placed in a press and the temperature is raised until the temperature of the material to be laminated is between about 90 to 140° C. (about 194 to 284° F. This operation can be performed either with or without a vacuum press. Generally, the occurrence of bubbles in the final thermoplastic article produced is less likely to occur if the air is evacuated prior to applying heat and pressure. The pressure on the sandwich/laminate is increased to between 0.55 to 1.4 MPa (about 80 to 200 psi) with a pressure of 1.24 MPa (180 psi) being preferred. As a result of pressure and heat, the sheets of copolyester are fused together and the fabric is embedded or encapsulated within the copolyester matrix.

When vacuum is applied during the lamination process, the pressure requirements are reduced significantly, e.g., from 1.73 MPa (about 250 psi) to 1.03 MPa (about 150 psi). It is desirable to maintain the pressure on the laminate/sandwich until the temperature of the resulting thermoplastic article decreases to a temperature less than the glass transition temperature of the copolyester. Then the fused thermoplastic article containing the fabric is removed from the press.

It may be possible to use lower temperatures, pressures and/or bonding times in the bonding process by the application of an adhesive material between the sheet materials to be bonded. HD2001 polyurethane dispersion (C. L. Hautheway & Sons, Inc.; Lynn, Mass.) is an example of an adhesive which may be used in the bonding process. Similar adhesive dispersions that may be used are available from Bostic (Middleton, Mass.) and Stahl USA (Peabody, Mass.).

The copolyesters constituting the sheet materials used in the manufacture of the articles and sheeting of the present invention may not be as hard or scratch resistant as may be necessary or desired for certain end uses. For example, an end use in which the exterior surface of the thermoplastic article may be subjected to scratching or abrasion, i.e., in a privacy partition, may require the application of an abrasion-resistant coating to one or both of the exterior surfaces. For example, films consisting of fluorinated hydrocarbons, poly (perfluoroethylene) such as TEDLAR from duPont Chemical Company or oriented poly(ethylene terephthalate) such as MYLAR from duPont Chemical Company may be used to improve both chemical and abrasion resistance. The abrasion resistant film typically has a thickness in the range of about 0.025 to 0.254 mm (0.001–0.01 inch), preferably about 0.051 to 0.178 mm (0.002–0.007 inch), and most preferably about 0.076 mm (0.003 inch). However, abrasion resistant film thinner or thicker than these ranges may be used since the thickness of such film is limited only by the equipment available cost and functionality considerations. An adhesive optionally may be used between the copolyester and the abrasion resistant film.

Alternatively, an abrasion resistant coating may be applied to a plastic film and then the film bearing the abrasion resistant coating may be laminated to one or both sides of the article or sheeting of the present invention. The film may be selected from a number of thermoplastic materials compatible with the lamination process such as poly(vinyl chloride), PETG copolyester, poly(ethylene terephthalate), poly(methyl methacrylate), polycarbonate and similar materials. The film thickness may range from 0.0025–0.381 mm (0.001–0.015 inch) with a thickness of 0.0762–0.203 mm (0.003–0.008) being most preferred. The coating may be selected from a number of commercially-available materials such as polyurethanes, fluorinated polyurethanes and silicones which are cured by heat or they may be selected from materials that are cured by ultraviolet (UV) or electron beam (EB) radiation. Such UV/EB cured materials fall under the general class of acrylates and modified acrylates that contain fluorine, silicone, epoxy, polyester, polyether or caprolactone residues or functional groups. The particular coating material selected will depend primarily on the degree of abrasion resistance required. Application of the liquid, heat- or UV/EB-curable precursor of the abrasion resistant coating may be carried out according to conventional procedures and usually is accomplished on a roll coating machine. The thickness of the coating applied to a film generally is 0.0076–0.051 mm (0.0003–0.002 inch) with thickness of about 0.0127 mm (0.0005 inch) being most preferred.

These coating may be applied in a manner similar to the application of paints. The coatings exist either as predominantly undiluted materials with very little volatile content or as solvent- or water-based materials. In addition to being applied to a film that can be laminated to the structure as part of the process, they may be applied directly to the finished product. Application may be carried out by a variety of techniques such as roll, paint, spray, mist, dip and the like.

After the thermoplastic article has cooled to a temperature below the glass transition temperature of the copolyester during the manufacture of the article, it can be shaped and thermoformed into a variety of useful products. As an illustrative example, the thermoplastic article can be thermoformed or otherwise shaped into sliding glass doors, shower doors, entrance doors, privacy partitions, stained glass windows, and table tops. The thermoplastic articles of this invention containing can be formed and molded without substantially distorting the fabric contained therein. In addition, the articles of the present invention have an appealing appearance with low density to facilitate transport and installation of building materials produced therefrom.

The invention has been described in detail with particular reference to preferred embodiments thereof, but it will be understood that variations and modifications can be effected within the spirit and scope of the invention.

We claim:

1. A thermoplastic article having a fabric comprised of textile fibers embedded therein obtained by applying heat and pressure to a laminate comprising, in order, (1) an upper sheet material having a thickness of about 0.76 to 6.4 mm, (2) a fabric comprised of textile fibers selected from cotton, wool, silk, rayon, polyesters, synthetic polyamides, acrylic, modacrylic and cellulose acetate fibers, and (3) a lower sheet material having a thickness of about 0.76 to 6.4 mm;

wherein the upper and lower sheet materials are formed from a copolyester having an inherent viscosity of 0.5 to 1.2 dL/g, when measured at 25° C. using 0.50 grams of polymer per 100 mL of a solvent consisting of 60 weight percent phenol and 40 weight percent tetrachloroethane, comprising:

(i) diacid residues consisting essentially of terephthalic acid residues; and (ii) diol residues consisting essentially of ethylene glycol residues and 1,4-cyclohexanedimethanol residues wherein the mole ratio of ethylene glycol residues: 1,4-cyclohexanedimethanol residues is about 10:90 to about 90:10.

2. A thermoplastic article according to claim 1 wherein the upper and lower sheet materials have a thickness in the range of about 0.76 to 6.4 mm.

3. A thermoplastic article according to claim 1 wherein the upper sheet material has a thickness in the range of about 1.6 to 3.2 mm, the mole ratio of ethylene glycol residues: 1,4-cyclohexanedimethanol residues is about 60:40 to about 80:20, and the copolyester has an inherent viscosity of 0.6 to 0.9 dL/g, when measured at 25° C. using 0.50 grams of polymer per 100 mL of a solvent consisting of 60 weight percent phenol and 40 weight percent tetrachloroethane.

4. A thermoplastic article according to claim 3 wherein the article includes an abrasion-resistant coating on one or both of the exterior surfaces of the article.

5. A thermoplastic article according to claim 4 wherein the abrasion resistant coating is a heat-, ultraviolet- or electron beam-cured material on a film of poly(vinyl chloride), PETG copolyester, poly(ethylene terephthalate), poly (methyl methacrylate) or polycarbonate.

6. A thermoplastic article according to claim 4 wherein the abrasion resistant surface is provided as a flourinated hydrocarbon, poly(perfluoroethylene), acrylic or oriented poly(ethylene terephthalate) film having a thickness in the range of about 0.051 to 0.178 mm.

7. A thermoplastic article according to claim 11 wherein the upper sheet material is transparent and the lower sheet material is translucent or opaque.

* * * * *